United States Patent
Hickey

[11] 3,884,186
[45] May 20, 1975

[54] TANK, FILTER AND DEPROTEINATOR FOR MARINE LIFE

[76] Inventor: William P. Hickey, 7585 Nottingham Dr., Lambertville, Mich. 48144

[22] Filed: May 18, 1973

[21] Appl. No.: 361,470

Related U.S. Application Data

[63] Continuation of Ser. No. 162,855, July 15, 1971, Pat. No. 3,760,767.

[52] U.S. Cl. .................................................. 119/3
[51] Int. Cl. .......................................... A01k 63/00
[58] Field of Search .................................... 119/3, 5

[56] References Cited
UNITED STATES PATENTS

| | | | |
|---|---|---|---|
| 976,242 | 11/1910 | Wohlfahrt | 119/5 |
| 1,528,179 | 3/1925 | Baldridge | 119/3 |
| 3,116,712 | 1/1964 | Ogden et al. | 119/3 |
| 3,374,771 | 3/1968 | Michie et al. | 119/5 |

FOREIGN PATENTS OR APPLICATIONS

453,843  6/1913  France

*Primary Examiner*—Hugh R. Chamblee

[57] ABSTRACT

A circular tank having a generally flat bottom with a sediment will positioned at one side thereof. Feces and other sediment are brought into the well by inducing a circular movement to the water within the tank to move the sediment around the tank and into the well. The tank preferably includes a standpipe arrangement within the well which continually removes the sediment from the well. The tank is preferably situated with the bottom sloping toward the sediment well. In large tanks, jets or water are positioned adjacent the bottom to jet the sediment up the slope of the tank where the circulation of the water then moves the sediment downwardly to the sediment well. Charged air bubbles are used to produce a froth of the dissolved protein surrounding the standpipe so that waste water also removes the protein. The tank is preferably made out of fiberglass so that it has very smooth internal surfaces which do not retain the sediment. The tank is inexpensively constructed using a fiberglass coated plywood bottom that is supported on a polygonal frame located centrally of the tank with the sediment well positioned between the frame and the sidewall of the tank. Outriggers from the frame extend under the sidewalls of the tank on opposite sides of the sediment well so that the sidewalls are utilized to carry verticle load and decrease the stresses are utilized to carry verticle load and decrease the stresses in the bottom of the tank.

7 Claims, 9 Drawing Figures

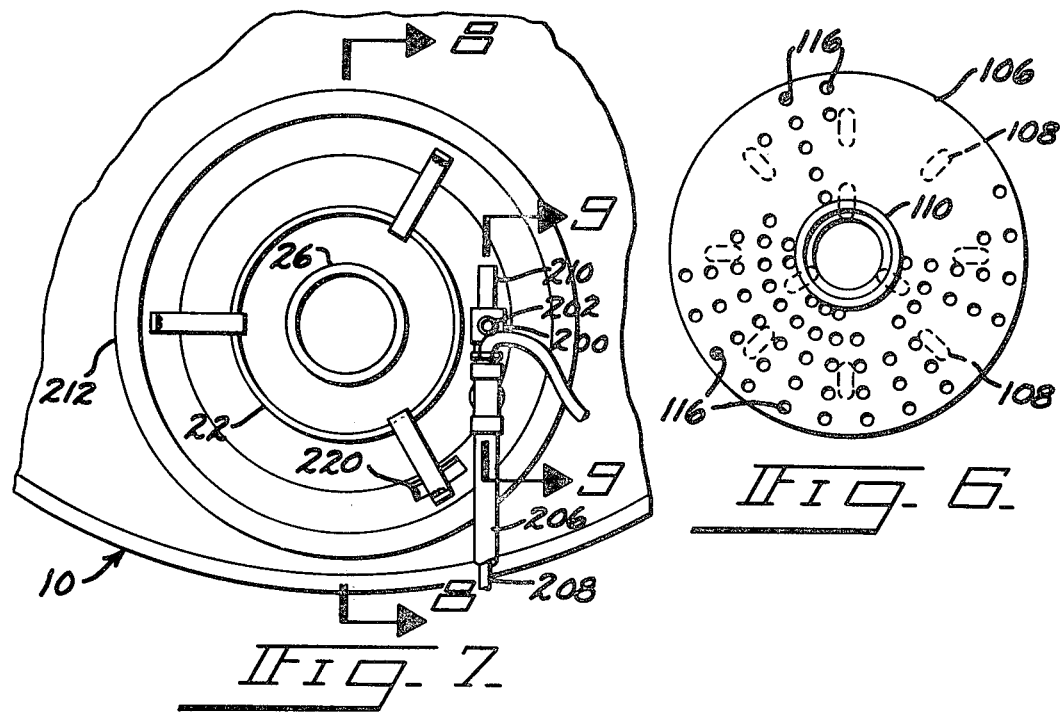
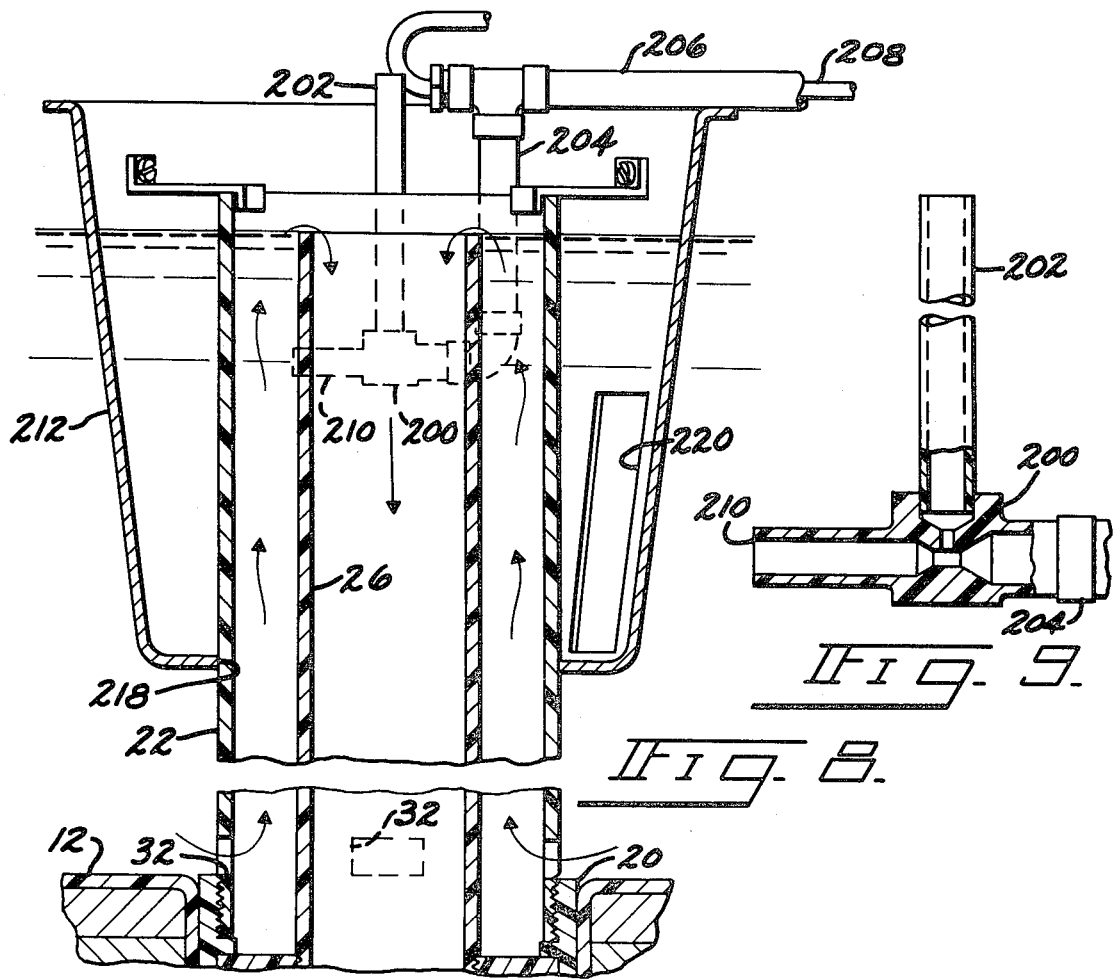

TANK, FILTER AND DEPROTEINATOR FOR MARINE LIFE

This is a division, of application Ser. No. 162,855, filed July 15, 1971, now U.S. Pat. No. 3,760,767.

BACKGROUND OF THE INVENTION

Various designs of tanks for marine life have been proposed heretofore. In one prior art design, a rectangular tank is provided having filters at one end, and a false bottom which carries water from the discharge of te filter to te opposite end of the tank where it is lifted above the false bottom by pumping means and caused to flow lengthwise of the tank to the filter. Feces collect upstream of the filter and are removed periodically by dumping or draining water from adjacent the filter.

In another arrangement, a circular tank is utilized having a bottom which slopes towards the center. A sediment well is located at the center, and a standpipe is positioned in the well. The sloping bottom permits the tank to be washed down and all water removed therefrom, but the feces are not automatically carried into the well and the configuration therefore is not self cleaning.

An object of the present invention is the provision of a new and improved circular tank congiduration for sustaning marine life which is self cleaning in that water cricualtion can be utilized to sweep the bottom clean and deposit the sediment in a well accessible from the periphery of the tank.

Another object of the invention is the provision of a new and improved filtration system for marine tanks which is simple in construction, inexpensive to manufacture, and which produces a flow of water tha automatically sweeps sediment on the bottom of a tank to the sediment well.

A still further object of the invention is the provision of a new and imporved deproteination system for tanks which sustain marine life, and which utilized the water which overflows a standpipe to carry away the foam that is produced by te deproteinator.

A still further object of the invention is the provision of a cobination aerator and a deproteination system in which the water is first cooled and then deproteinated by charged bubbles of air which efficiently removes the protein and aerates the water.

BRIEF DESCRIPTION OF THE DRAWINGS

FIG. 6 is a plan view of a flase bottom shown in FIGS. 4 and 5;

FIG. 7 is a fragmentary plan view of an embodiment of deproteination system constructed according to the present invention;

FIG. 8 is a sectional view taken approximately on the line 8—8 of FIG. 7; and

FIG. 9 is a fragmentary section view taken approximately on the line 9—9 of FIG. 7.

DESCRIPTION OF THE PREFERRED EMBODIMENTS

Although the invention may be otherwise embodied, it is herein shown and described as embodied in a tank for sustaining fish life.

One of the problems that is invlved in fish tanks is that feces and unconsumed food collect on the bottom and polute the water. The prior art has utilized round tanks having a generally centrally located drain and has in some instances sloped the bottom towards this drain to aid in washing down the tank. THe round tanks of the prior art will not automatically and continuously remove the sediment from the bottom, however.

According to the present invention, a tank having generally cylindrically shaped sidewalls is provided, and a slow, sustained swirling motion is provided to the water to sweep the sediment around the tank and into a sediment well. The bottom of the tank is generally flat, so that the sediment does not flow towards the center, and the sediment well is provided at one side of the bottom adjacent the sidewall where it is readily accessible. The tank is preferably installed with its bottom at a slight incline and with the sediment well at the lowermost part of the tank. The water in the the tank is preferably swirled by a stream of make up water, or by a return stream of filtered water, and these streams preferably discharge tangentially adjacent the portion of the bottom which is inclined upwardly, so as to move the sediment over the top of the incline. By so doing circulation of the water in the tank carries the sediment to the sediment well where it settles out and is removed by flow out of the tank drain.

Figure 1:
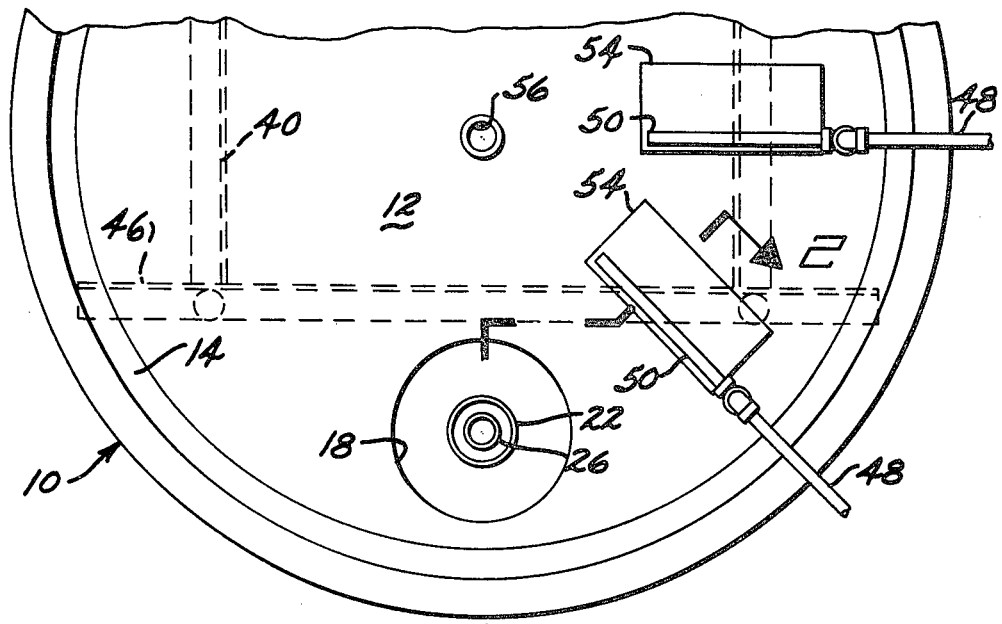
FIG. 1. of the drawings is a fragmentary plan view of a tank embodying priciples of the present invention.
Figure 2:
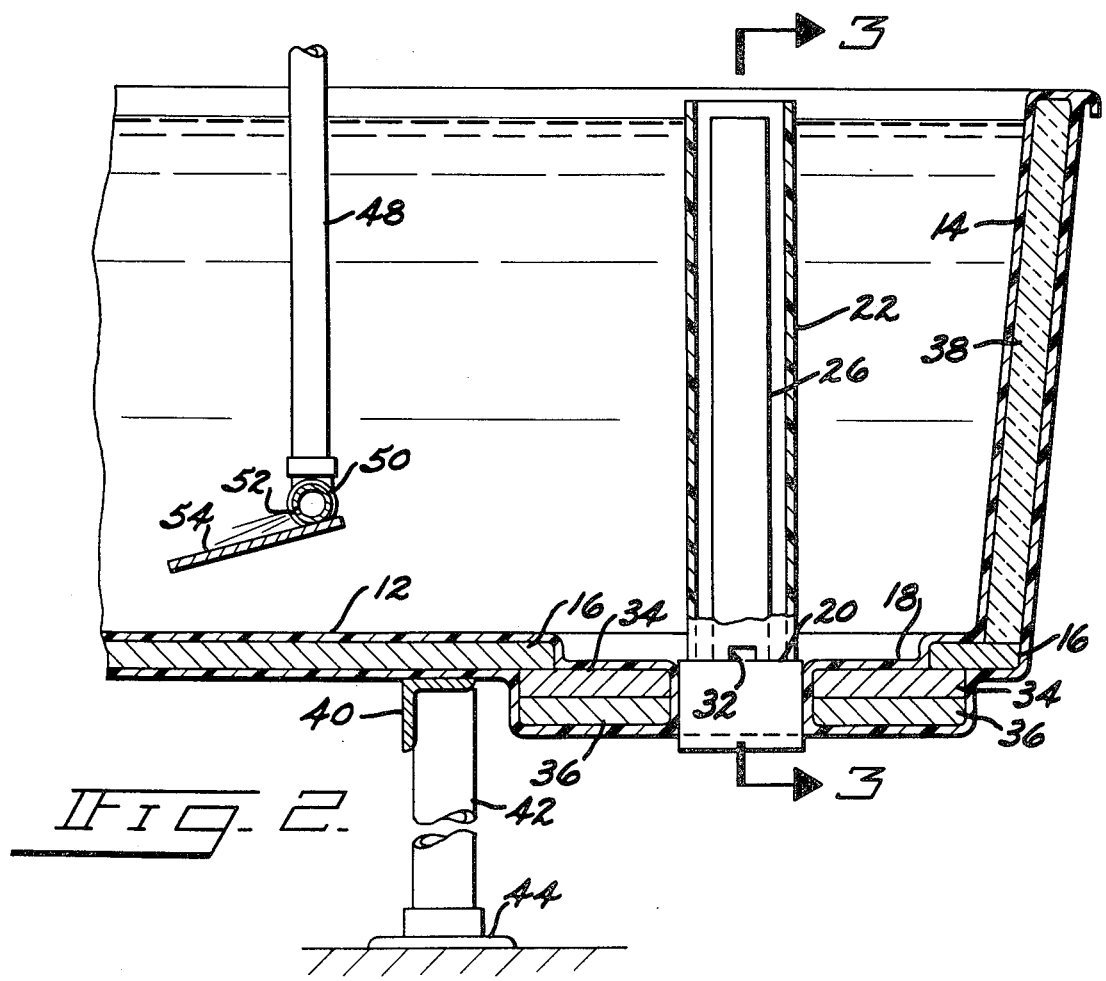
FIG. 2 is a sectional view taken approximately on the line of 2—2 of FIG. 1.
Figure 3:
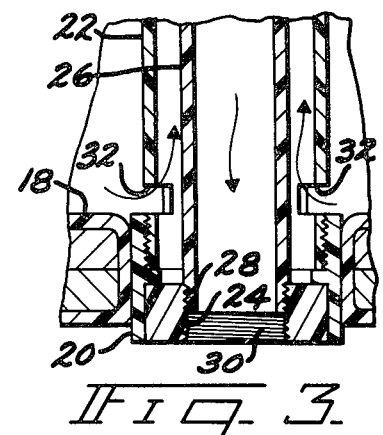
FIG. 3 is a fragmentary sectional view taken approximately on the line 3—3 of FIG. 2.

The tank 10 shown in FIGS. 1 through 3 has a generally flat bottom 12, and generally cylindrically shaped sidewalls 14 which are slightly tapered upward and outwardly for rigidity, ease of manufacturing and ease of shipping. While the tank may be made of any suitable material it is preferably made of molded glass fiber reinforced plastic so that it has an inside surface which is extremely smooth. The bottom of the tank is reinforced by at least one layer of plywood 16 which acts as a structural member and has a depression or sediment well 18 therein adjacent one side edge of the bottom. A large plastic drain fitting 20 extends through the bottom with the top of the fittng beng flush with the bottom of the sediment well. The drain fitting 20 is cemented in place by the reinforced plastic of the tank, and a tubular member 22, whose function will later be described, is screwed into the upper end of the fitting 20. The fitting 20 has a reduced diameter opening 24 in its bottom half and a standpipe 26 is threaded into pipe threads 28 in the upper end of the opening 24 to provide an overflow or standpipe for the tank. The bottom of the opening 24 is also threaded as at 30 for connecting a drainpipe thereto. The opening 24 with its threads 28 and 30 is shown as made by a plastic insert that is cemented in the fitting 20.

The tubular number 22 may have a plurality of openings 32 therethrough and be used for the purpose of keeping fish away from the water passing over the standpipe, but preferably is used to elevate the feces and sediment from the bottom of the tank upwardly through the annular region between the tube 22 and standpipe 26 where the sediment overflows the standpipe. When this latter function is desired, the opening will be limited to the bottom openings 26 opposite the top surface of the sediment well 18. In the tank shown in the drawing, the sediment well is circular and another piece of annular plywood is provided around the drain fitting 20 for reinforcing the bottom of the depression 20. In as much as cold water will hold more dissolved oxygen than warm water, it will usually be desired to keep the water in the tank colder than room temperature, and accordingly the side walls of the tank are provided with a layer of insulation 38. A layer of fiberglass is provided over the plywood insulation 38 to completely seal off the outside of the tank.

In some instances the tank may be installed with its bottom absolutely horizontal, but in most instances it will preferably be installed with the bottom inclined towards the sediment well so that the tank can be completely drained. Flat bottom structures generally lack rigidity and in order that the tank can be adequately supported, the bottom rests on a frame 40 having a flat upper polygonal or circular surface whose minimum width corresponds approximately to one half the diameter of the bottom. The outside edge of the bottom is supported by the conically shaped sidewalls 14. In the embodiment shown in FIGS. 1 and 2, the frame is made of welded angle iron, and the frame 40 is supported at a slight incline to the horizontal by means of four tubular legs 42 which are welded to the angle iron frame 40 at an angle to the vertical of approximately 2 degrees. The bottom of the tubular legs 42 are threaded, and a threaded flange 44 is provided thereon so as to provide a height adjustment to compensate for irregularities in the floor on which the tank is installed. The load from the conical side walls 14 is picked up by means of outriggers 46 which pass underneath the sidewalls 14. In the embodiment shown, the outriggers 46 are an extension of the angle irons forming two sides of the frame 40. The sidewalls 14 preferably have a tape of more than 6 degrees, and as shown in the drawing have an angle of 7½ degrees with a perpendicular to the bottom of the tank.

It will now be seen that rotation of the water within the tank can be utilized to move sediment around the tank and into the sediment well 18. Streams of high velocity water introduced in a manner creating turbulence will pick up the sediment and deposit it in quiescent zones which occur at the sediment well. The prior art has not been able to effectively use rotation of water to remove sediment from the bottom. Water is injected into the tank shown in the drawing in generally sheet form by an inlet pipe 48 having a horizontal leg 50 therein spaced upwardly from the bottom and containing a plurality of small holes 52 therethrough. The streams of water from the holes 52 impinge upon a flat inclined plate 54 that is welded to the horizontal leg 50, and the water spreads out into a uniform layer to sweep the sediment along the bottom of the tank. In addition the plate 54 causes water circulating around the tank to be forced downwardly towards the bottom in a uniform layer of increased velocity. Where the bottom of the tank is installed on an incline, the inlets will preferably be located along the portion of the bottom where the sediment must be swept upwardly. In some instances it may be desired to insure that the sediment does not collect in the center of the tank. In the embodiment shown in the drawing a third inlet pipe 56 is provided having its bottom spaced a short distance upwardly from the top surface of the bottom of the tank to cause water to flow radially outwardly in a sheath. Where an abundant supply of fresh water is available, the inlet pipes 48 and 56 may be supplied with fresh make up water, while in instances where water is scarce, the inlet pipes 48 and 56 may be supplied with recirculated filtered water.

Figure 4:
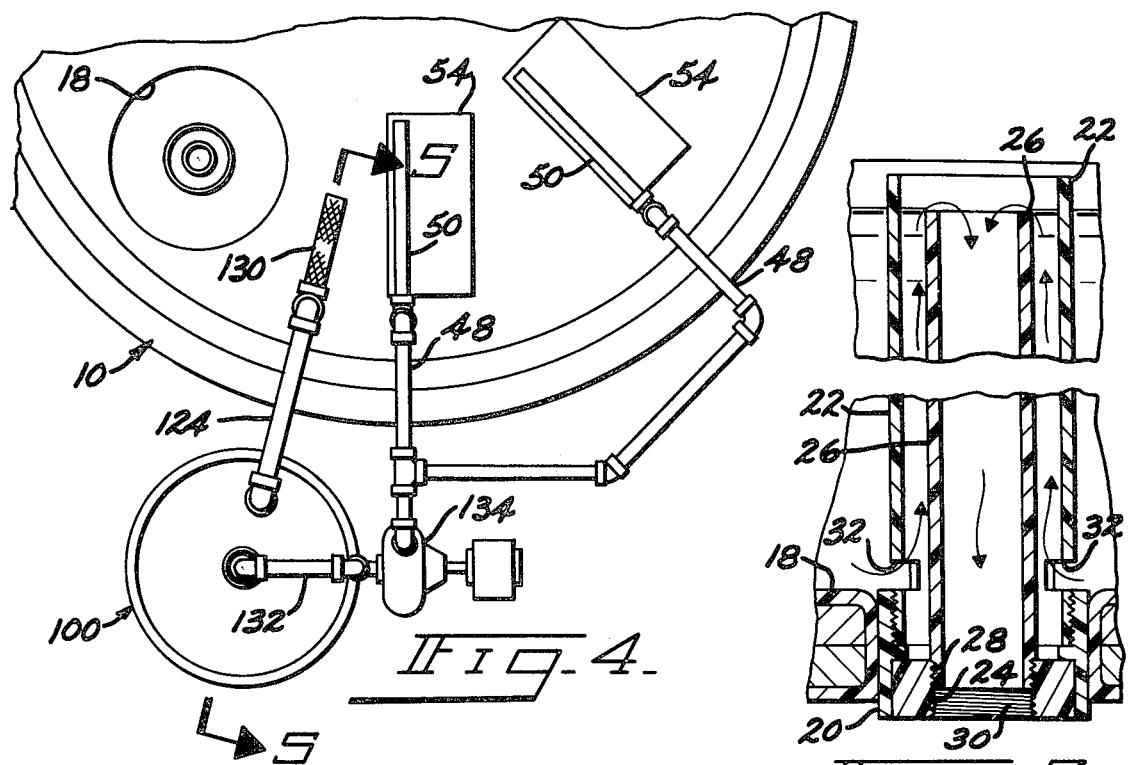
FIG. 4 is a fragmentary plan view of the tank shown in FIG. 1, but further including an improved filtration system of the present invention.
Figure 5:
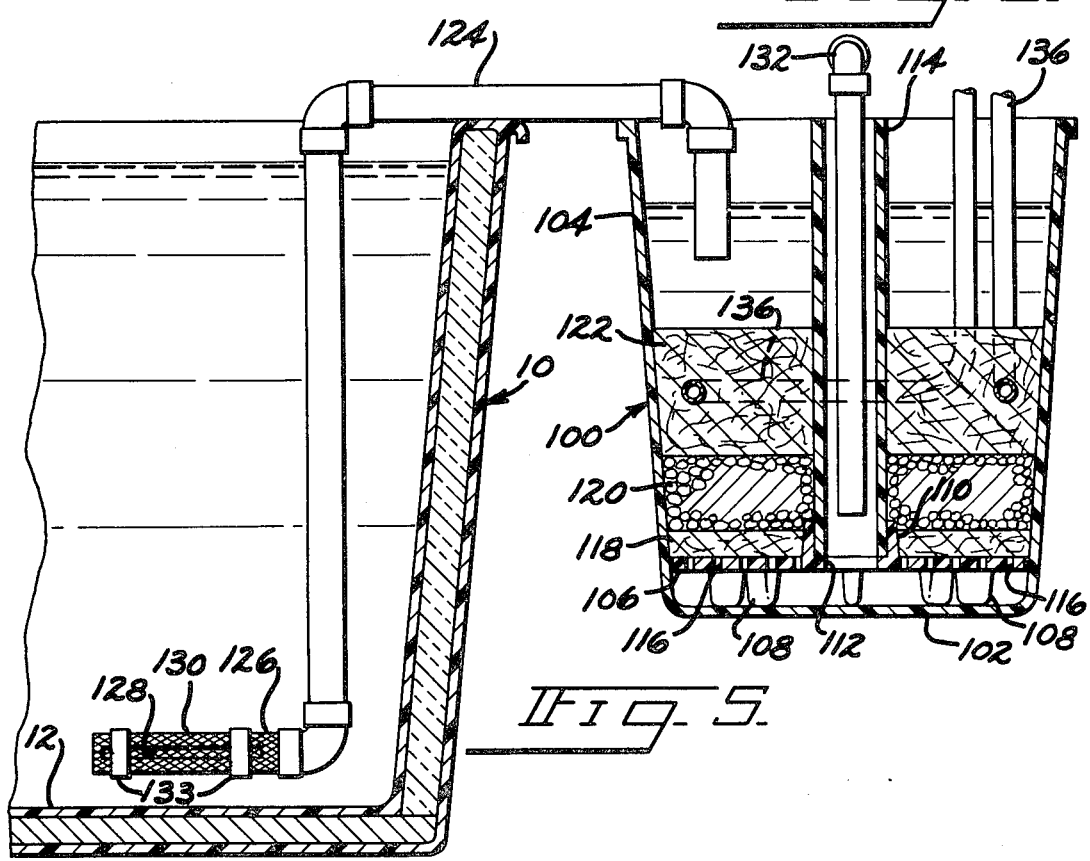
FIG. 5 is a sectional view taken approximately on the line 5—5 of FIG. 4.

The filtering system about to be described can be used with any configuration of marine life sustaining tank, and has particular advantages when used with the round tank previously described. The filter shown in FIGS. 4 through 6 comprises a generally cylindrical container 100 having a closed bottom 102, and preferably having sidewalls 104 which are tapered upwardly and outwardly for ease of maintenance, and manufacture. The filter 100 is provided with a false bottom 106 having legs 108 thereon to support the false bottom from the bottom 102. The false bottom has a centrally located boss 110 which provides an outlet opening 112 for the region below the false bottom. The central opening 112 has sidewalls which are tapered upwardly and outwardly to receive a stand pipe 114. The false bottom 106 has a plurality of openings 116 therethrough through which water enters the space beneath the false bottom. A layer of fiberglass 118 is provided on top of the false bottom to prevent solid materials from passing through the openings 116, and a layer of charcoal 120 is positioned on top of the fiberglass layer 118. A layer of fiberglass or other filtration material is positioned on top of the charcoal, and the inlet water is brought into the region above the filter layer 122 by a siphon 124. The cylindrical container 100 has an appreciable heighth, and its top is located generally above the liquid level of the tank 10, so that water will not overflow the container 100 whenever flow stops.

In the embodiment shown, the container 100 is positioned adjacent a side of the tank 10 and the siphon 124 extends down towards the bottom of the tank 10. The siphon is provided with a horizontal leg 126 that is spaced slightly above the bottom 12 of the tank and the horizontal leg 126 has a longitudinal opening or slot 128 therein. A section of screen 130 is wrapped around the horizontal 126, and the screen is held in place by suitable bands 132. The slot 128 faces in the opposite direction to the circulating flow of water in the tank 10 so that the water that is sucked into the siphon 124 will produce circulation of the water in the tank. The horizontal leg 126 is preferably positioned slightly downstream of sediment well to cause the water to be swept over the sediment well, and the sediment to drop into the well 18. It will therefore be seen that the tank 10 will be cleaned of sediment and that most of this sediment is prevented from entering the filter structure.

Flow through the filter can be induced by connecting a pump to the stand pipe 114, but in the preferred embodiment shown in the drawing, the flow is induced by a inlet pipe 132 which extends down through the central opening of the stand pipe 114. The inlet pipe takes suction adjacent the bottom of the standpipe. The filter can be lowered relative to the siphon and inlet pipe without disrupting the piping and easily cleaned. The discharge from the pump 134 cna be recirculated back to the tank in any suitable manner, and as previously described, is preferably delivered in a manner which produces rotation of the water within the tank 10. In the embodiment shown in the drawing the discharge of the pump 134 is connected to the water inlet pipes 48.

In many instances it will be desired to cool the filtered water. This can be conveniently accomplished by a cooling coil 136 positioned above the false bottom 126. The coil 136 is located in the layer of fiberglass 122, sos that the bulk of the sediment in the water will be prevented from collecting on the coil. The cooling coil arrangement described will permit the container 104 to be removed without breaking the connections to the cooling coil, so that a refrigerant such as Freon can be used in the coil 136, if so desired. Where salt water is being filtered, the cooling coil 135 will preferably be made of a short section of titanium and Freon with preferably be circulated through the coil. Optimum conditions for heat transfer therefore exist, since the sediment is prevented from collecting on the cooling coil, and an appreciable velocity of water past the cooling coil is had within the filter layer 122.

Water which sustains a high level of marine life must have dissolved protein removed therefrom and must have dissolved oxygen added. This is conveniently accomplished in the structure shown in FIGS. 7 through 9 by producing a foam of the dissolved protein in the region adjacent the top of the overflow pipe, and causing the overflow water to carry the foam down and out of the overflow. In the preferred form of the arrangement, the means for extracting the protein comprises means for injecting electrically charged tiny air bubbles into a stream of recirculated water, and preferably filtered water. According to one aspect of the invention the recirculated water is first cooled before air bubbles are introduced thereto, so as to not only reduce the solubility of protein in the water, but simultaneously increase the ability of the water to absorb oxygen and thereby increase efficiency of both the aerating and deproteinating processes. In the embodiment shown, the means for injecting air bubbles into the recirculating stream is a venturi 200 having a standpipe 202 connected to an opening in the throat of the venturi. The standpipe 202 leads upwardly above the liquid level to supply air to the venturi. The recirculating stream enters through the pipe 204 which stream has previously passed through a heat exchanger 206 having a Freon pipe 208 therein which, when salt water is being handled, can be made ot titanium. The velocity of the water through the venturi sucks air down through the tube 202 to produce charged minute air bubbles which are discharged with the water from the outlet 210. The discharge from the venturi 210 enters a container 212 which surrounds the upper end of the standpipe 26. The container 212 is fastened to the tubular member 22 which in turn is positioned around the standpipe 26. The container 212 has an opening 218 whose sidewalls have a tight fit with respect to the tubular member 22. The container has a discharge opening 220 from which the deproteinated and oxygenated water is discharged in the direction of the circulating water flow to add to the energy that is producing circulation of the water in the tank.

As previously state, the openings 32 in the bottom of the tubular member 22 are located so as to cause the overflow water to pick up sediment from the bottom and carry it upwardly in the annular region between the tubular member 22 and the standpipe 26 and overflow the top of the standpipe. The air bubbles that are discharged from the venturi outlet 210 cause the dissolved protein to produce a foam which immediately rises to the surface of the water in the container 212. The foam overflows the top of the tube 22 and is washed over the top and down the inside of the standpipe 26 by the effluent water. Efficient use of the overflow water is thereby made to not only remove sediment from the tank, but to also carry away the rejected protein. By reason of the prior cooling of the recirculated water, the discharge water from the deproteinating system is efficiently oxygenated and discharged back to the tank in a manner circulating the water within the tank 10. The container 121 preferably has conically shaped side walls with the large end adjacent the top thereof to decrease the velocity of the water adjacent the top while retaining the velocity of the oxygenated water that is circulated back to the tank through opening 220. The container 212 is conviently made of plastic. In some instances the heat exchanger 206 can be omitted, and the necessary cooling done solely in the filter. In still other instances the cooling coil, although less efficient, can be installed within the tank 10 adjacent the outlet of the opening 220 where the velocity of the discharged water can impinge upon the cooling coil.

While the invention has been described in considerable detail, I do not wish to be limited to the particular embodiments shown and described, and it is my invention to cover hereby all novel adaptations, modifications, and arrangements thereof which come within the practice of those skilled in the art to which the invention relates.

I claim:

1. A tank having an internal water recirulation path that is uninterrupted by walls, and which path fish can traverse continuously, said tank at the same time providing for continuous water purification and comprising: a generally flat bottom and a generally cylindrical side wall; said side walls being slightly conically tapered with the small diameter portion being adjacent the bottom, said bottom being stiffened with plywood, and the bottom and side walls having a smooth inside layer of glass fiber reinforced plastic; a sump in said bottom adjacent said generally cylindrical side wall, a conduit means for taking suction on the water in said tank and having an inlet positioned in said tank spaced circumferentially to one side of said sump and adjacent said bottom; said conduit means being constructed and arranged to have an inlet facing said sump to induce a circulatory flow of water over said sump but permitting the main recirculation path in said tank to pass thereby; and means introducing a layer of water into said tank in the direction of said recirculation path for adding energy to said recirculation path to keep the water in said tank recirculating; said means including structure for spreading said water into a layer having sufficient cross section that its velocity when united with said recirculation path does not produce turbulence which holds fesces suspended off of said bottom.

2. The tank of claim 1 including: support means for supporting the bottom of said tank at an incline to the horizontal with said sediment well adjacent the lower most portion of the tank; and wherein said means for introducing a stream of water is located adjacent the bottom of the tank and discharges upwardly of the sloping bottom to force sediment up the inclined portion of the bottom.

3. The tank of claim 1 including a ploygonal or circular support frame lying inside of said sidewalls and sediment wells and outriggers on said frame extending out to support said sidewalls on opposite sides of said sediment well.

4. The tank of claim 1 including: a standpipe in said sump, and a tubular member surrounding said standpipe and having holes through its sidewalls adjacent the bottom of said tank, said means for introducing water to said tank displacing water out of said tank to cause sediment from said well to be carried up the space between said standpipe and tubular member and overflow said standpipe.

5. The tank of claim 1 wherein said layer of water for adding energy to said recirculating path is located above the bottom but well below the surface of the water in the tank.

6. The tank of claim 1 wherein said means for introducing a layer of water comprises: a generally horizontal plate spaced from said bottom, and nozzles discharging across said plate in a manner generally parallel to said plate to produce a layer of low velocity water for sustaining said water recirculation path in said tank.

7. The tank of claim 1 wherein said means for introducing a layer of water comprises: a generally horizontal plate spaced from said bottom, and nozzles discharging across said plate in a manner generally parallel to said plate to prevent nozzle turbulence from holding fesces suspended off of said bottom.

* * * * *